Aug. 11, 1959  B. I. ULINSKI  2,899,223
INDUSTRIAL TRUCK DRIVE RATIO
Filed Feb. 20, 1956  3 Sheets-Sheet 1

INVENTOR.
B. I. Ulinski
BY
A. H. Golden
ATTORNEY

Aug. 11, 1959     B. I. ULINSKI     2,899,223
INDUSTRIAL TRUCK DRIVE RATIO
Filed Feb. 20, 1956     3 Sheets-Sheet 2
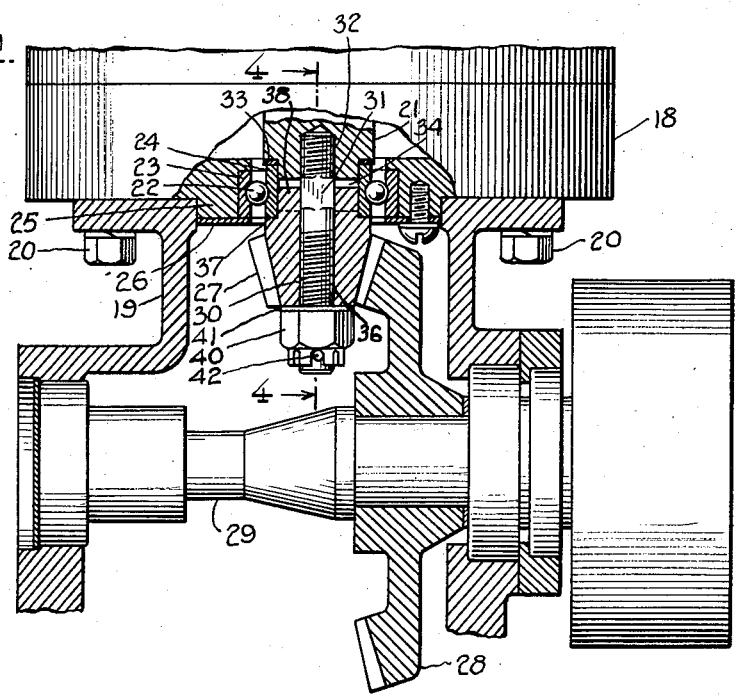
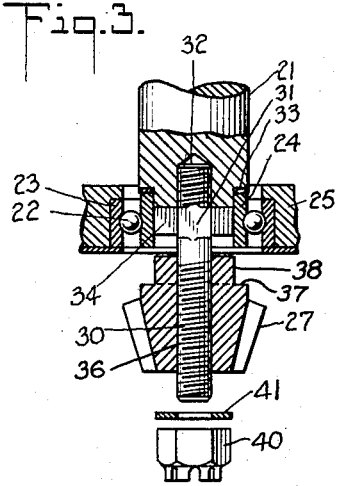
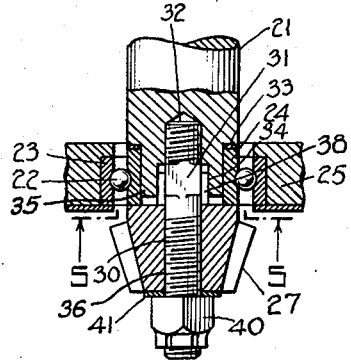
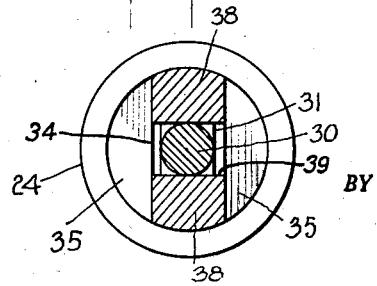
INVENTOR.
B. I. Ulinski
BY
ATTORNEY Aug. 11, 1959  B. I. ULINSKI  2,899,223
INDUSTRIAL TRUCK DRIVE RATIO
Filed Feb. 20, 1956  3 Sheets-Sheet 3
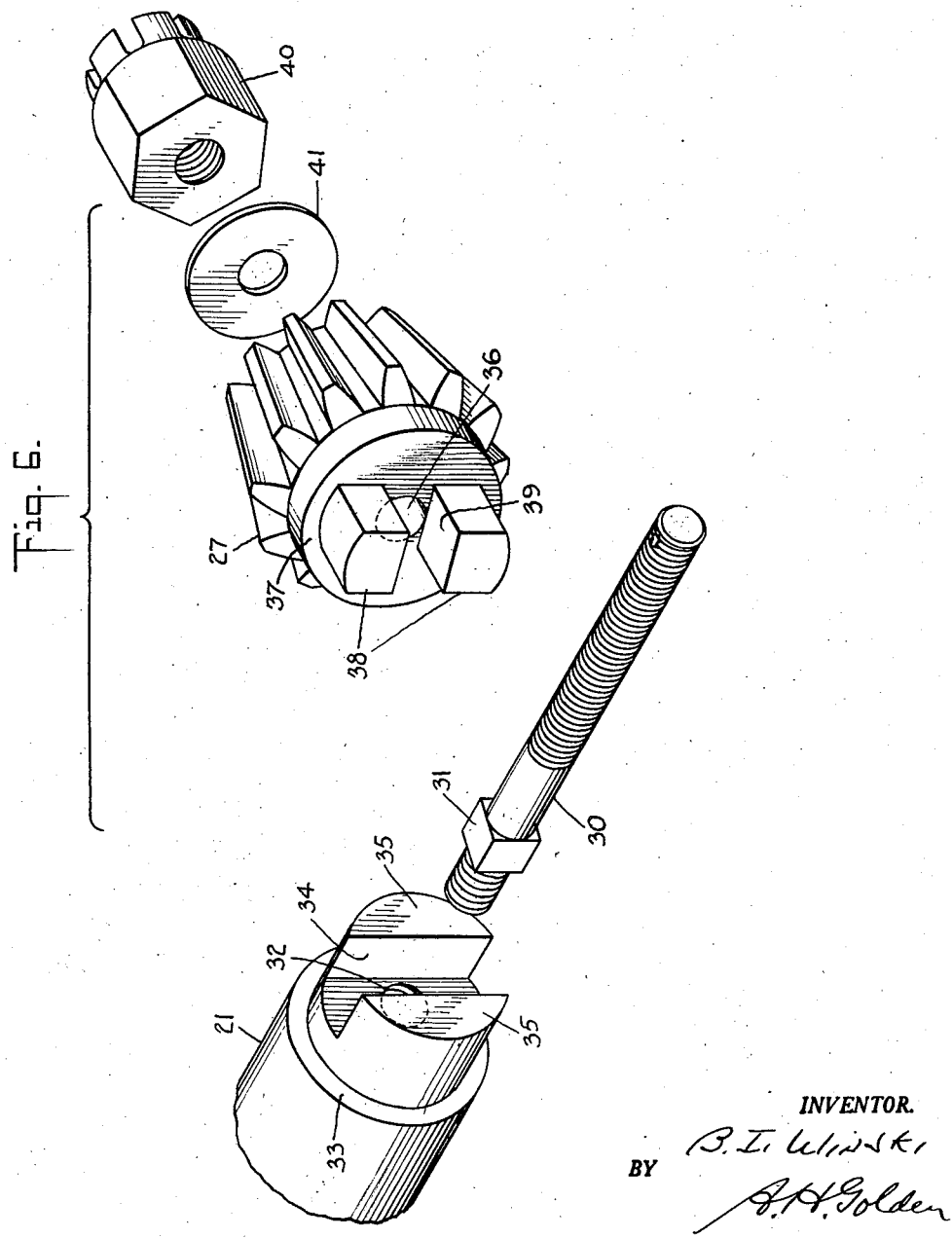
INVENTOR.
B. I. Ulinski
BY
A. H. Golden
ATTORNEY

United States Patent Office 2,899,223
Patented Aug. 11, 1959

2,899,223
INDUSTRIAL TRUCK DRIVE RATIO

Bronislaus I. Ulinski, Flossmoor, Ill., assignor to The Yale & Towne Manufacturing Company, Stamford, Conn., a corporation of Connecticut Application February 20, 1956, Serial No. 566,572

5 Claims. (Cl. 287—53)

This invention relates to an industrial truck, and more particularly to an industrial truck of the type in which a motor is adapted to drive a traction wheel through a system of gearing. Even more particularly, my invention relates to a truck of that type in which a motor acts through gearing to drive a steering and traction wheel, with the motor, gearing and traction wheel forming parts of a traction unit that rotates bodily on the truck frame for steering the truck.

It is frequently necessary in the trucks of this type to change the gear ratio between the motor and the traction wheel in order to adapt the truck to a different class of service. This can best be accomplished by changing the pinion secured to the shaft of the traction motor. However, very considerable problems are involved in constructing the pinion so that it can be changed for that purpose, since a small pinion ordinarily requires a very small shaft, and it is undesirable to have too small a shaft if larger pinions are to be accommodated. I have now conceived an extremely novel construction whereby I can very readily utilize pinions of different sizes for changing the drive ratio in a truck of the particular type, with that novel construction enabling me to achieve an exceedingly satisfactory and effective drive whether the pinion be large or small.

As a feature of my invention I contribute, to a combination of the class described, means for securing a pinion to a shaft that makes possible the utilization of extremely small pinions, as well as relatively large pinions, with the shaft of one size that is satisfactory for any of those pinions.

As a particular feature of my invention, I form my motor shaft so that there may be secured thereto, preferably through screw threads, a relatively long stud. By forming the pinion so that the stud passes therethrough, it is possible to utilize the stud to secure the pinion to the shaft. As a further feature of the invention, the application of the pinion to the shaft locks the pinion against rotation relatively to the shaft while simultaneously locking the stud against release rotation. Through the particular combination, I thereby secure the stud to the motor shaft, and the pinion to the stud and the motor shaft, with the stud and pinion both being locked against rotation relatively to the motor shaft.

As a more particular feature of my invention, the stud is screw threaded into the shaft and extends through a bore in the pinion so that a nut secured at the end of the stud will hold the pinion against removal from the end of the shaft. Then, through the slabbing of the end of the pinion, it is possible to insert that end into a slot in the end of the shaft for locking the pinion against rotation relatively to the shaft. By particularly forming the pinion slab, I am able to lock the stud against rotation through a cooperative relationship between the stud and the slab.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

Fig. 2 is a longitudinal section of my novel pinion construction.

Fig. 3 is like a part of Fig. 2 but with the pinion separated from the motor shaft.

Fig. 4 is a view on the line 4—4 in Fig. 2.

Fig. 5 is a cross section on the line 5—5 in Fig. 4.

Fig. 6 is an exploded view showing parts of my invention.

Figure 1:
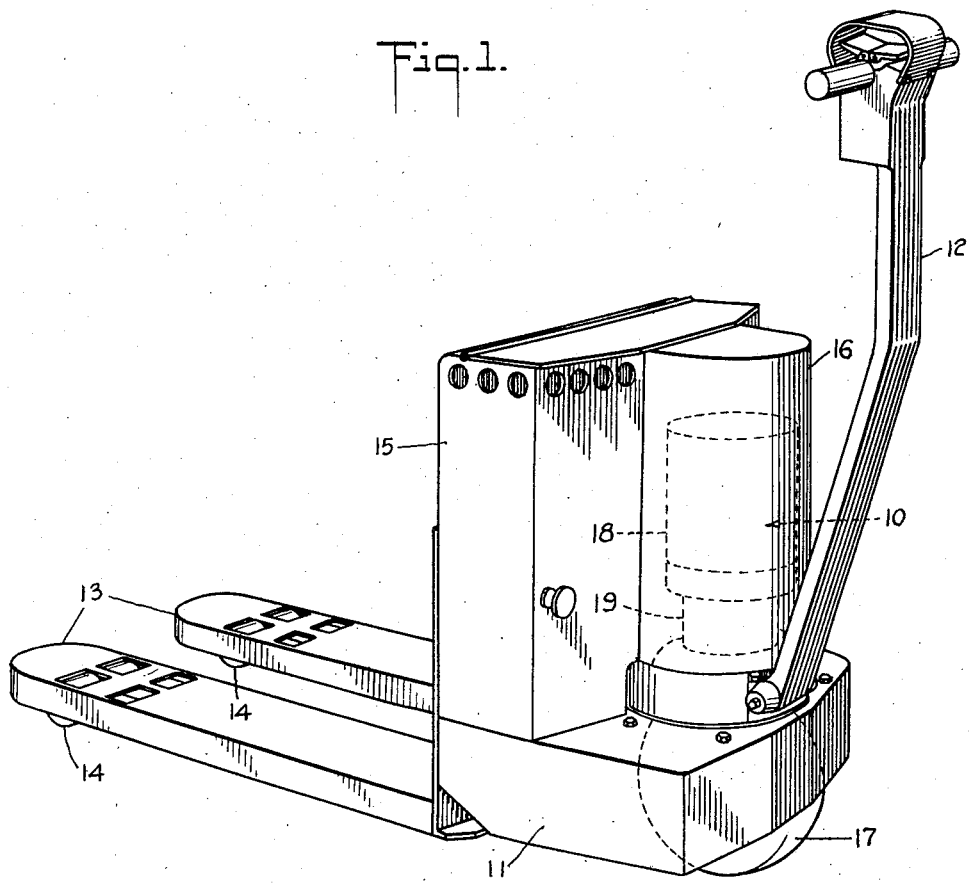
Fig. 1 shows an industrial truck on which I utilize my invention.

In order that my invention may be readily understood, I show in Fig. 1 an industrial truck of the class described that moves on a steering and traction unit 10 on the front end of the truck. The unit 10 is mounted to rotate on the truck frame 11 for steering the truck, and is equipped with a steering handle 12. I believe it will not be necessary to describe the construction of the truck in particular detail, and I shall state simply that the truck has a load platform 13, load wheels 14 on which the rear end of the truck moves, and a battery cover 15 on the frame 11, with a part 16 of that cover enclosing the upper portion of the steering and traction unit 10.

It will be appreciated that the steering and traction unit 10 has a ground engaging wheel 17, and a traction motor 18 acting through a system of gears in a casing 19 to drive the wheel 17. I do not show a particular gear system since it will not contribute to a description of my invention, but I do prefer to utilize the gear arrangement that I show in my earlier application entitled "Gear Drive Steering and Traction Unit," filed February 1, 1956, Serial No. 562,710. For the purpose of my present application, it is necessary to know merely that a particular drive ratio exists between the traction motor 18 and ground engaging wheel 17. It is this drive ratio that must be changed when it becomes necessary to adapt the truck for transporting loads under different conditions of service.

Referring now more particularly to Fig. 2 of the drawings, I show the traction motor 18 mounted on the gear casing 19 through bolts 20, with the motor shaft 21 in a vertical position. Of course, I do not wish to be limited to that position since it is conceivable that the motor may be horizontal. The lower end of the motor shaft 21 rotates on ball bearings 22 having rather usual outer and inner ball races 23, 24 that are retained relatively to end plate 25 on the motor through a ring 26. Rotating with the lower end of motor shaft 21 is a drive pinion 27 that forms a part of my invention and that I shall describe in full detail. I show drive pinion 27 in meshing relation to a bevel gear 28 like that shown in my earlier application, to which I have already referred, the gear 28 being mounted on a shaft 29 in gear casing 19 and forming a part of the gear system in the casing.

In the extremely novel construction that I have now conceived, I utilize a retaining stud 30, well shown in Figs. 2 to 6, for mounting the drive pinion 27 on the motor shaft 21. In the form of my invention that I prefer, the retaining stud 30 is threaded on its opposed end portions, and has a square or other non-circular shaped medial portion 31. The end of motor shaft 21 has an axial bore 32 that is threaded for one end of retaining stud 30, and I form that end of shaft 21 with a shoulder 33 whereby the shaft rests on the upper end of the inner bearing race 24 while fitting within that race. In addition, I form that part of motor shaft 21 that fits within ball race 24 with a transverse slot 34, best seen in Fig. 6, thus leaving segments 35 on the shaft at opposed sides of the slot. As will be apparent from Figs. 4 and 5, the slot 34 is considerably wider than the square stud portion 31, so that retaining stud 30 can be rotated into assembled position with its square portion 31 between the segments 35 on the shaft.

Referring again to Fig. 6, I form the drive pinion 27 with a plain bore 36 for the retaining stud 30, and also with a shoulder 37 whereby the pinion is adapted to rest against the lower end of the inner bearing race 24. Moreover, I form on the end of pinion 27 a slabbed portion 38 having a slot 39. When pinion 27 is assembled, as in Figs. 2, 4 and 5, its slabbed portion 38 will fit within the slot 34 on motor shaft 21, so that the pinion cannot rotate relatively to the shaft. The square 31 on the retaining stud 30 will then lie in the slot 39 of the pinion, as best seen in Figs. 2 and 5, with opposed parts of the slabbed portion 38 juxtaposed to square 31 so that the stud 30 cannot rotate relatively to the pinion or shaft. In order to hold drive pinion 27 in assembled position, I utilize a nut 40 and washer 41 on the outer end of retaining stud 30, with a cotter pin 42 preventing release movement of nut 40.

It will be understod that the nut 40, when assembled on the stud 30, will hold the drive pinion 27 and motor shaft 21 relatively to the opposed ends of the inner bearing race 24, as is clearly shown in Figs. 2 and 4. Thereby the pinion 27 will be locked to the motor shaft 21, since the slabbed portion 38 on the pinion will be engaged positively in the slot 34 in the motor shaft. Moreover, the pinion 27 cannot loosen through rotation of the retaining stud 30, since the square on that stud is interlocked with the slabbed pinion portion 38. When assembled, therefore, the pinion 27 will be in effect an integral part of the motor shaft.

It is extremely important to realize that the novel construction I have described enables me to utilize motor pinions of widely different sizes on the motor shaft 21. This will be better appreciated when it is understood that my invention enables me to retain the pinion through a stud 30 that is quite small in diameter, so that it can be utilized with a very small pinion. On the other hand, while utilizing the small diameter stud 30, the slabbed pinion portion 38 and the motor shaft segments 35 furnish interlocking surfaces that are ample for driving a very large diameter pinion. Those interlocking surfaces, despite their size, are arranged at the end of the pinion, and will not prevent the use of a very small pinion. Whether the pinion be large or small, the pinion will be very securely assembled and will be in effect an integral part of the motor shaft. It will naturally be possible to change the pinions on the motor shaft 21 simply through the removal of the nut 40 from retaining stud 30. The changing of bevel gear 28 in order to mate with the pinion presents no particular problem, since that may be accomplished simply through removal of shaft 29 on the gear casing 19.

I have contributed by my invention an extremely novel construction that enables me very easily to change the gear ratio of an industrial truck. I thereby facilitate to a very great extent the adaptation of industrial trucks to different types of service, and I believe, therefore, that those skilled in the art will appreciate that my invention is of very considerable value to the industry.

I now claim:
1. In a truck of the class described, a motor drive shaft, a retaining stud screwed into a threaded bore in the end of said shaft, a pinion or the like adapted to be fitted on the end of said shaft, said shaft and pinion having keying portions so that said pinion when fitted on the end of said shaft will not rotate relatively to the shaft, said pinion having an opening therethrough and through which the retaining stud extends, a nut on the end of the retaining stud holding the pinion against endwise removal from the shaft, and means between the stud and pinion holding the stud against rotation relatively to said shaft and pinion.

2. In a truck of the class described, a motor drive shaft, a threaded retaining stud inserted into a bore in the end of said shaft, means whereby said stud is then secured to said shaft against endwise removal, a pinion or the like adapted to be fitted on the end of said shaft, said shaft and pinion having keying portions so that said pinion when fitted on the end of said shaft will not rotate relatively to the shaft, said pinion having an opening therethrough and through which the retaining stud extends, a nut threaded on the end of the retaining stud for holding the pinion against endwise removal from the shaft, and means between the stud and pinion holding the stud against rotation relatively to said shaft and pinion.

3. In a truck of the class described, a motor drive shaft, a retaining stud screwed into the end of said shaft, a pinion adapted to be assembled on the end of the shaft, said shaft and pinion formed with interlocking surfaces whereby the pinion and shaft when assembled will not rotate relatively to one another, said pinion having an opening therethrough and through which the retaining stud extends, a nut on the end of the retaining stud holding the pinion against endwise removal from the shaft, and means between the stud and shaft acting when the pinion is so held to secure the stud against rotation relatively to said shaft.

4. In a truck of the class described, a motor drive shaft, a threaded retaining stud screwed into the end of said shaft, a pinion or the like, a slab on the end of said pinion fitting into a slot in the end of the shaft so that said pinion will not rotate relatively to the shaft, said pinion having an opening therethrough and through which the retaining stud extends, a nut on the end of the retaining stud holding the pinion against endwise removal from the shaft, and said stud having an angular portion fitted into a corresponding opening in said pinion slab when said slab is placed in said shaft slot, said angular portion holding the stud against rotation relatively to said shaft and pinion.

5. In a truck of the class described, a motor having a drive shaft, a transverse slot at the end of said drive shaft, a drive pinion having a slabbed portion fitting into said slot, a stud screw threaded into said drive shaft and having a part thereof extending outwardly of said shaft through said slot and beyond said slot, said pinion having a bore for said stud passing therethrough and outwardly centrally of the outer end of the pinion, said stud having a squared portion and the slabbed end of said pinion having surfaces formed to lie against said stud squared portion whereby said pinion and stud are locked against rotation relatively to one another, thereby locking said stud against rotation relatively to said shaft, and threaded means on the end of said stud for applying pressure to the end of the pinion to hold the pinion against removal from said shaft.

References Cited in the file of this patent

UNITED STATES PATENTS

| | | |
|---|---|---|
| 906,337 | Thaler | Dec. 8, 1908 |
| 1,781,721 | Earl | Nov. 18, 1930 |
| 2,269,429 | Brenkert | Jan. 13, 1942 |
| 2,744,777 | Mucher | May 8, 1956 |